(12) United States Patent
Citron (10) Patent No.: US 10,858,512 B1
(45) Date of Patent: Dec. 8, 2020

(54) BIODEGRADABLE TEXTILE YARN AND TEXTILE MADE FROM RECYCLED MATERIALS

(71) Applicant: Everywhere Apparel Inc., Chicago, IL (US)

(72) Inventor: Maxwell Citron, Chicago, IL (US)

(73) Assignee: Everywhere Apparel Inc., Chicago, IL (US)

( * ) Notice: Subject to any disclaimer, the term of this patent is extended or adjusted under 35 U.S.C. 154(b) by 0 days.

(21) Appl. No.: 16/947,657

(22) Filed: Aug. 11, 2020

Related U.S. Application Data (60) Provisional application No. 62/914,628, filed on Oct. 14, 2019, provisional application No. 62/886,271, filed on Aug. 13, 2019.

(51) Int. Cl.
   *C08L 67/03* (2006.01)
   *C08L 1/02* (2006.01)

(52) U.S. Cl.
   CPC .............. *C08L 67/03* (2013.01); *C08L 1/02* (2013.01); *C08L 2203/12* (2013.01); *C08L 2207/20* (2013.01)

(58) Field of Classification Search
   CPC ........ C08L 67/03; C08L 1/02; C08L 2203/12; C08L 2207/20
   USPC ....................................................... 523/222
   See application file for complete search history.

(56) References Cited

U.S. PATENT DOCUMENTS

| | | | | |
|---|---|---|---|---|
| 5,614,298 A | * | 3/1997 | Tanaka | D04H 1/425 428/219 |
| 8,796,356 B2 | * | 8/2014 | Kannan | C08K 3/34 523/124 |
| 9,994,686 B2 | | 6/2018 | Wong et al. | |
| 2011/0071235 A1 | * | 3/2011 | Kannan | C08G 63/183 523/128 |
| 2011/0152807 A1 | | 6/2011 | Huang et al. | |
| 2018/0010265 A1 | | 1/2018 | Tao et al. | |

FOREIGN PATENT DOCUMENTS

| | | |
|---|---|---|
| CN | 102817179 A | 12/2012 |
| CN | 104762695 A | 7/2015 |
| CN | 107034571 A | 8/2017 |
| WO | 2019026002 A1 | 2/2019 |

OTHER PUBLICATIONS

Hongsriphan et al. "Mechanical and thermal properties of Eucalyptus fiber composites from blend between biodegradable poly(butylene succinate) and recycled PET", Journal of Metals, Materials and Minerals (2017), 27(1), 13-23. (Year: 2017).*

Sombatdee et al. "Effects of polylactic acid and rPET minor components on phase evolution, tensile and thermal properties of polyethylene-based composite fibers", Polymers for Advanced Technologies (2018), 29(3), 1123-1137. (Year: 2018).*

Borg et al. "Early age performance and mechanical characteristics of recycled PET fibre reinforced concrete", Construction and Building Materials (2016), 108, 29-47. (Year: 2016).*

* cited by examiner

*Primary Examiner* — Michael Bernshteyn
(74) *Attorney, Agent, or Firm* — American Patent Agency PC; Daniar Hussain; Xiaomeng Shi (57) ABSTRACT

A biodegradable textile yarn made from recycled materials is disclosed, comprising a biodegradable, recycled polyethylene terephthalate (bio-rPET) fiber blended with a recycled natural fiber. The bio-rPET fiber is made from a recycled PET (rPET) and a biodegradable PET additive to make the rPET biodegradable. The biodegradable PET additive is between 0.5 and 3 weight % of a total weight of the biodegradable PET fiber. The bio-rPET fiber is more than 1 weight % inclusive of a total weight of the biodegradable textile yarn. Further disclosed are a biodegradable textile made from the biodegradable textile yarn, and systems and methods for making the biodegradable textile yarn. Also disclosed are benefits of the new biodegradable textile yarns, and alternative embodiments.

10 Claims, 5 Drawing Sheets

BIODEGRADABLE TEXTILE YARN AND TEXTILE MADE FROM RECYCLED MATERIALS

REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF INVENTION

The present invention relates to biodegradable textile yarns, and processes and apparatus for their manufacturing. Such biodegradable textile yarns are used to produce fabrics, garments, woven cloths, and other textiles with biodegradable properties beneficial to the natural environment.

BACKGROUND OF THE INVENTION

The statements in the background of the invention section are provided for assistance with understanding the invention and its application and uses, and may not constitute prior art.

As an essential item to daily life, clothing is mostly made of fabrics and textiles, which are interlacing or interlocking networks of yarns and threads put together through weaving and knitting. A yarn is a continuous length of interlocked fibers, while a thread is a type of yarn used for sewing fabrics together. Yarn is derived by spinning natural or synthetic fibers using automatic spinning processes, and various technical improvements have been made over the past centuries to enable continuous high-speed spinning on large commercial scales. Efficient, continuous high-speed spinning requires the interlocking fibers to withstand substantial tension, and careful considerations are needed in the selection and pre-processing of fibers when making high tenacity yarns. Furthermore, a sufficiently high breaking tenacity is needed for the yarn to be practically usable in high speed knitting machines without excessive breakage, and to produce garments of sufficiently high quality.

Natural or synthetic fibers that can be made into yarns and threads comprise wool, flax, cotton, hemp, linen, nylon, silk, and polyester. The most common fibers for spinning into yarns are cotton and polyester, with polyester fiber being the most important synthetic fiber worldwide in terms of production volume. Polyester fiber is made in a melt-spinning and extrusion process where molten polymer material derived from natural gas and oil is extruded through a spinneret in continuous strands or filaments. Further blending of polyester and cotton fibers together, and spinning the resulting polycotton blend result in polyester-cotton yarns that when made into garments such as T-shirts or shorts, show improved properties such as wrinkle, tear, and stain resistance, reduced shrinking, long lasting durability, light weight, and moisture-wicking capabilities. Tri-blend yarns made from polyester, cotton, and rayon have further been widely used in making apparels for a soft and light feel, and for moisture-absorbing properties.

While unknown to many, the apparel industry is one of the biggest sources of pollution on the planet, both in terms of resource pollution and waste pollution. Cotton as a crop requires a large of amount of water to grow, in addition to toxic pesticide usages. Making a single conventional 50% cotton/50% poly T-shirt can consume over 650 gallons of fresh water, leading to significant stress on water recourses when practiced on an industrial scale. The production of polyester also consumes large amounts of carbon-intensive non-renewable resources. In addition, about 20% of industrial water pollution is due to garment manufacturing, which uses approximately 20,000 chemicals, many being harmful, even carcinogenic, and can cause significant environmental damage if left untreated when released into water and air. During wear, polyester-based textiles shed polyester fibers into the marine ecosystem with every wash, leading to bioaccumulation of polyester micro-fibers in wastewater and in the marine ecosystem. Polyester micro-fibers build up in animal tissue and eventually make their way into human bodies through consumption of contaminated water or animals. Furthermore, most polyester fabrics are not considered biodegradable, for they take tens to hundreds of years to break down, depending on the environment they are in. Without biodegradability, polyester yarns and garments continue to contribute to polyester microfilament pollution far beyond their typical life spans and even beyond the human life time.

More recently, processes have been developed in which polyester filaments are extruded with a copolymer resin to form a yarn that may biodegrade in a commercial composting facility, but the benefit of this technology is limited in real-world textile disposal settings and for single-stream undifferentiated textile recycling applications. Furthermore, recycled polyester and mechanically recycled cotton have been combined for environmentally sustainable apparel production, but recycled cotton fibers are irregular, short, and more fragile, thus relying on polyester for yarn strength, again leading to the polyester micro-filament shedding and pollution problem.

Therefore, in view of the aforementioned difficulties, there is an unsolved need to manufacture a polyester-based yarn that leaves minimal environmental footprint during production, is mechanically strong for use with commercial textile manufacturing machines, retains its preferred characteristics during use and wear, and just as importantly, is biodegradable when released into the ecosystem.

It is against this background that various embodiments of the present invention were developed.

BRIEF SUMMARY OF THE INVENTION

The present disclosure relates to biodegradable textile yarns made from recycled synthetic and natural materials, biodegradable textiles comprising networks of the biodegradable textile yarns, and a process and apparatus for producing the biodegradable textile yarns.

In one aspect, one embodiment of the present invention is a biodegradable textile yarn made from recycled materials, comprising: a biodegradable, recycled polyethylene terephthalate (bio-rPET) fiber blended with a recycled natural fiber, wherein the bio-rPET fiber is made from a recycled PET (rPET) and a biodegradable PET additive to make the rPET biodegradable, wherein the biodegradable PET additive is between 0.5 and 3 weight % (wt %) of a total weight of the biodegradable PET fiber, and wherein the bio-rPET fiber is more than 1 wt % inclusive of a total weight of the biodegradable textile yarn.

In some embodiments, the bio-rPET fiber is between 5 wt % and 95 wt % inclusive of the total weight of the biodegradable textile yarn. In some embodiments, the bio-rPET fiber is between 10 wt % and 75 wt % inclusive of the total weight of the biodegradable textile yarn. In some embodiments, the bio-rPET fiber is between 40 wt % and 60 wt % of a total weight of the biodegradable textile yarn. In some embodiments, the bio-rPET fiber is between 50 wt % and 60 wt % inclusive of a total weight of the biodegradable textile yarn. In some embodiments, the rPET has an intrinsic viscosity between 0.25 dL/g and 0.85 dL/g. In some embodiments, the bio-rPET fiber has a linear mass density between 0.05 tex and 0.5 tex.

In some embodiments, the recycled natural fiber comprises at least one selected from the group consisting of a mechanically recycled cotton fiber, a mechanically recycled hemp fiber, a mechanically recycled linen fiber, a chemically recycled cellulose fiber, and a recycled wool.

In some embodiments, the biodegradable textile yarn further comprises a recycled cellulose fiber blended with the bio-rPET fiber and the recycled natural fiber.

In another aspect, one embodiment of the present invention is a textile, comprising: a network of biodegradable textile yarns, wherein each biodegradable textile yarn comprises a biodegradable, recycled polyethylene terephthalate (bio-rPET) fiber blended with a recycled natural fiber, wherein the bio-rPET fiber is made from a recycled PET (rPET) and a biodegradable PET additive to make the rPET biodegradable, wherein the biodegradable PET additive is between 0.5 and 3 weight % (wt %) of a total weight of the biodegradable PET fiber, and wherein the bio-rPET fiber is more than 1 wt % inclusive of a total weight of the biodegradable textile yarn.

In yet another aspect, one embodiment of the present invention is a process for producing a biodegradable textile yarn, comprising the steps of drying a recycled polyethylene terephthalate (rPET) and a biodegradable PET additive; mixing the rPET and the biodegradable PET additive into a mixture, wherein the biodegradable PET additive is between 0.5 and 3 weight % (wt %) of a total weight of the mixture; extruding a biodegradable rPET (bio-rPET) fiber from the mixture; blending the bio-rPET fiber with a recycled natural fiber into a biodegradable recycled fiber blend, wherein the bio-rPET fiber is more than 1 wt % of a total weight of the biodegradable recycled fiber blend; and spinning the biodegradable recycled fiber blend to the biodegradable textile yarn.

In some embodiments, the bio-rPET fiber is between 5 wt % and 95 wt % inclusive of the total weight of the biodegradable textile yarn. In some embodiments, the bio-rPET fiber is between 10 wt % and 75 wt % inclusive of the total weight of the biodegradable textile yarn. In some embodiments, the bio-rPET fiber is between 40 wt % and 60 wt % of a total weight of the biodegradable textile yarn. In some embodiments, the bio-rPET fiber is between 50 wt % and 60 wt % inclusive of a total weight of the biodegradable textile yarn. In some embodiments, the rPET has an intrinsic viscosity between 0.25 dL/g and 0.85 dL/g. In some embodiments, the bio-rPET fiber has a linear mass density between 0.05 tex and 0.5 tex.

In some embodiments, the recycled natural fiber comprises at least one selected from the group consisting of a mechanically recycled cotton fiber, a mechanically recycled hemp fiber, a mechanically recycled linen fiber, a chemically recycled cellulose fiber, and recycled wool.

In some embodiments, the blending of the bio-rPET fiber with the recycled natural fiber further comprises blending the bio-rPET fiber and the recycled natural fiber with a recycled cellulose fiber into the biodegradable recycled fiber blend.

In some embodiments, the biodegradable PET additive is between 1 wt % and 1.5 wt % of a total weight of the mixture.

Yet other embodiments of the present invention include the biodegradable textile yarns and textiles made by the processes disclosed herein.

Yet other aspects of the present invention include methods and processes comprising the steps described herein, and also include the processes and modes of operation of the systems and machines described herein. Other aspects and embodiments of the present invention will become apparent from the detailed description of the invention when read in conjunction with the attached drawings.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. For clarity, simplicity, and flexibility, not all elements, components, or specifications are defined in all drawings. Not all drawings corresponding to specific steps or embodiments of the present invention are drawn to scale. Emphasis is instead placed on illustration of the nature, function, and product of the manufacturing method and devices described herein.

Embodiments of the present invention described herein are exemplary, and not restrictive. Embodiments will now be described, by way of examples, with reference to the accompanying drawings, in which.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures, devices, activities, methods, and processes are shown using schematics, use cases, and/or diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

As used herein, the singular forms "a," "an," and "the" include plural references unless the context clearly indicates otherwise. Thus, for example, reference to "a fiber" includes a single fiber as well as a mixture of two or more different fibers, and the like. Also as used herein, the term "about" in connection with a measured quantity, refers to the normal variations in that measured quantity, as expected by one of ordinary skill in the art in making the measurement and exercising a level of care commensurate with the objective of measurement and the precision of the measuring equipment. In certain embodiments, the term "about" includes the recited number +/−10%, such that "about 10" would include from 9 to 11.

EVERYWHERE is a trademark name carrying embodiments of the present invention, and hence, the aforementioned trademark names may be interchangeably used in the specification and drawing to refer to the products/manufacturing process offered by embodiments of the present invention. The terms EVERYWHERE, EVERYWHERE APPAREL and EVERYWHERE APPAREL INC. may be used interchangeably in this specification to describe the biodegradable textile yarns, textiles, fabrics, garments, and apparels made from the biodegradable textile yarns, the process to make such biodegradable textile yarns, as well as the company providing said product and/or manufacturing process. With reference to the figures, embodiments of the present invention are now described in detail.

Overview and Introduction

Broadly, embodiments of the present invention relate to a biodegradable textile yarn made from recycled materials, comprising a biodegradable, recycled, synthetic polyester fiber blended with a recycled natural fiber. Despite the degraded nature of the recycled input materials, embodiments of the present invention provide a practically usable yarn with sufficiently high tenacity so it can be knitted with high speed industrial machines without excessive breakage to produce high quality garments having basic properties comparable to that made from virgin materials, while also being biodegradable, sustainable, and environmentally friendly. Biodegradable textile yarns as disclosed herein may be used for the production of textile articles such as garments, woven cloth, carpets, as well as other consumer products.

More specifically, embodiments of the present invention relate to making biodegradable yarns from biodegradable, recycled, polyethylene terephthalate (bio-rPET) fibers and recycled natural fibers, the fibers blended at specific composition ratios for making yarns having different linear densities and breaking tenacities. Moreover, embodiments of the present invention relate to drying and mixing recycled polyethylene terephthalate (rPET) with a biodegradable polymer additive at specific moisture levels, extruding the biodegradable mixture into bio-rPET fibers under specific temperatures, blending with the recycled natural fibers, and spinning the blend to make the biodegradable textile yarn.

Polyethylene terephthalate (PET) is the most common thermoplastic polymer, which can be re-melted, remolded, and recycled. Typically, when PET is used in making fiber for woven or non-woven cloth, it is referred to as a "polyester." Polyester-cotton blends or polycotton fabrics have been used widely in producing moisture wicking, wrinkle resistant, tear resistant, soft, and light-weight apparel, but this production process often consumes significant non-renewable resources and generates harmful chemicals as byproducts, while the end polyester products are typically non-biodegradable, where their decomposition in nature takes tens or hundreds of years, leaving significant adverse impacts on the global ecosystem. For example, a conventional dry-blend 50% cotton/50% polyester T-shirt may cost, during production, over 650 gallons of water, 0.4 kg in $CO_2$ emissions, and significant toxic pesticide usage, while staying in the environment for up to 200 years to fully biodegrade.

In some embodiments, the biodegradable textile yarns disclosed herein are made fully from recycled materials. In some embodiments, the recycled materials comprise recycled PET (rPET) and recycled natural fibers. For example, the biodegradable textile yarns may be made from recycled PET (rPET) flakes, pellets, and so forth that have been recycled from bottles or PET plastic waste reclaimed from the ocean, and natural fibers recycled from garments and/or agricultural sources. Recycled natural fibers such as recycled cotton fibers are short and irregular in nature, and need to rely on the longer, more regular, and high tenacity rPET fibers for strength and consistency. To ensure a strong enough textile yarn can be made from the rPET flakes, the rPET may be required to have a high enough intrinsic viscosity, for example between 0.25 deciliters per gram (dL/g) and 0.85 dL/g. Intrinsic viscosity (IV) is an indicator of the average length of the PET's polymer chain and a main indicator of PET quality. The longer the polymer chain, the heavier the molecular weight, the higher crystallinity and tensile strength, and the higher the IV.

The rPET flakes are made into the biodegradable bio-rPET by mixing with a biodegradable additive, where the additive attracts microorganisms to the biodegradable textile yarn when released into the natural environment. For example, a biodegradable PET additive may make up between 0.5 and 3 weight percentage (wt %) of a total weight of the bio-rPET fiber. The extent of biodegradability of the biodegradable textile yarns may be determined according to technical standards developed and published by international standard organizations such as the American Society for Testing and Materials (ASTM). The additive itself is also biodegradable and may be recycled and/or recyclable. In some embodiments, the mixing or blending of the biodegradable additive with the rPET may occur during a melt-spinning and fiber extrusion process, without re-compounding the additive masterbatch. In some embodiments, the rPET and biodegradable additive may be melted and made into a compound pellet first.

Depending on the desired linear density of the biodegradable textile yarn, composition ratios between the bio-rPET fibers and the recycled natural fibers may be adjusted into different preferred ranges. For example, to make a 30 English Cotton Count (Ne) singles yarn, the bio-rPET fiber may make up between 40 wt % and 60 wt % of a total weight of the biodegradable textile yarn. The resulting 30 Ne biodegradable textile yarn may subsequently be used to make a garment, such as a shirt, a coat, pants, a dress, or active-wear. Similarly, biodegradable textile yarns having other linear densities may be used for making other consumer products, such as a tent, a carpet, a furniture cover, or other upholsteries.

Biodegradation of Biodegradable Textile Yarns

Figure 1:
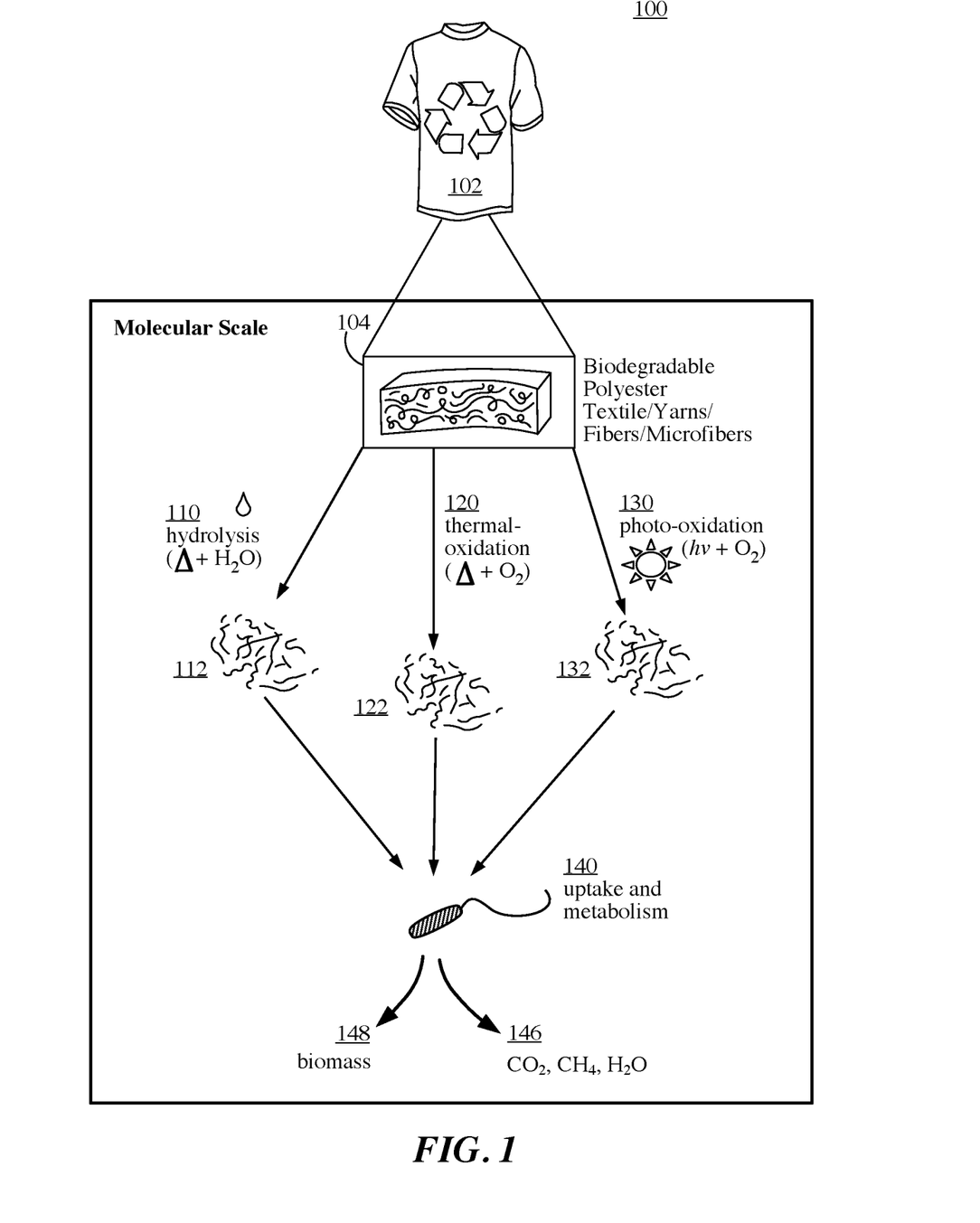
FIG. 1 illustrates exemplary biodegradation pathways for biodegradable yarns and textiles made according to one embodiment of the present invention.

FIG. 1 is a diagram 100 that illustrates exemplary biodegradation pathways for biodegradable yarns and textiles made according to one embodiment of the present invention. Generally, the biodegradation of polyester involves the breaking down and transformation of polymer chains into smaller constituent molecules through hydrolysis and oxidation, and the uptake by microorganisms such as bacteria to turn the polyester into carbon dioxide ($CO_2$), methane ($CH_4$), water ($H_2O$), and metabolic biomass. That is, biodegradation is caused by organismic activities that disintegrate and convert polyester into elements that can re-enter the ecological cycle, where influencing factors include, but are not limited to, external mechanical forces, moisture level and humidity, temperature, solar radiation, enzyme activities and other biotic interactions.

Specifically, in some embodiments, when a T-shirt 102 made from the biodegradable textile yarns disclosed herein sheds polyester microfibers during use and wear, or is disposed after use, the constituting biodegradable textile yarns, fibers, or micro-fibers 104 may decompose, on a molecular scale, through a hydrolysis process 110 in water, a thermal oxidation process 120 in air, or a photo-oxidation process 130 in air. The hydrolysis process 110 ruptures the chemical bonds of polymer chains in biodegradable textile yarn 104 with water, based on the nucleophilic properties of water molecules. Thermal-oxidation 120 causes chain scission where chemical bonds are attacked by atmospheric oxygen. Photo-oxidation 130 is the alteration and breaking down of polymer chains by absorption of ultraviolet (wavelength from 300 to 400 nm), visible light (400-750 nm) or infrared sunlight (750-2500 nm) radiation. Hydrolysis and oxidation processes 110, 120, and 130 break long polymer chains in biodegradable textile 104 into shorter chains 112, 122, and 132 that may include oligomers, dimers, and monomers, the exact composition of which depend on the nature and extent of the hydrolysis and oxidation processes, respectively. Subsequently, microbes 140 consume the shorter chains or molecules intercellularly and extracellularly, further converting them to metabolic by-products 146, including carbon dioxide ($CO_2$) under aerobic conditions, methane ($CH_4$) under anaerobic conditions, water ($H_2O$), and biomass 148. Furthermore, contaminants in the polyester may degrade to bound residues with organic matter residue of the soil (not shown).

In some embodiments of the invention, the biodegradability of the biodegradable textile yarn 104 is measured, defined, or determined by methods specified in standard test protocols ASTM D6691, ASTM D5210, and ASTM D5511, developed and published by the American Society for Testing and Materials. ASTM D6691 is the *Standard Test Method for Determining Aerobic Biodegradation of Plastic Materials in the Marine Environment by a Defined Microbial Consortium or Natural Sea Water Inoculum*, ASTM D5210 is the *Test Method for Determining the Anaerobic Biodegradation of Plastic Materials in the Presence of Municipal Sewage Sludge*, and ASTM D5511 is the Standard *Test Method for Determining Anaerobic Biodegradation of Plastic Materials Under High-Solids Anaerobic-Digestion Condition*, the entireties of which are hereby incorporated by reference herein. For example, finished biodegradable textile yarn and textile products made therefrom may demonstrate similar degradation to 100% cotton textile yarns in 1 year based on ASTM D6691, ASTM D5210, and/or ASTM D5511. In some embodiments, the biodegradability of biodegradable textile yarn 104 may be specified or defined by other similar biodegradation standard tests, such as those developed and published by the Organisation for Economic Co-operations and Development (OECD), or the International Organization for Standardization (ISO).

Figure 2:
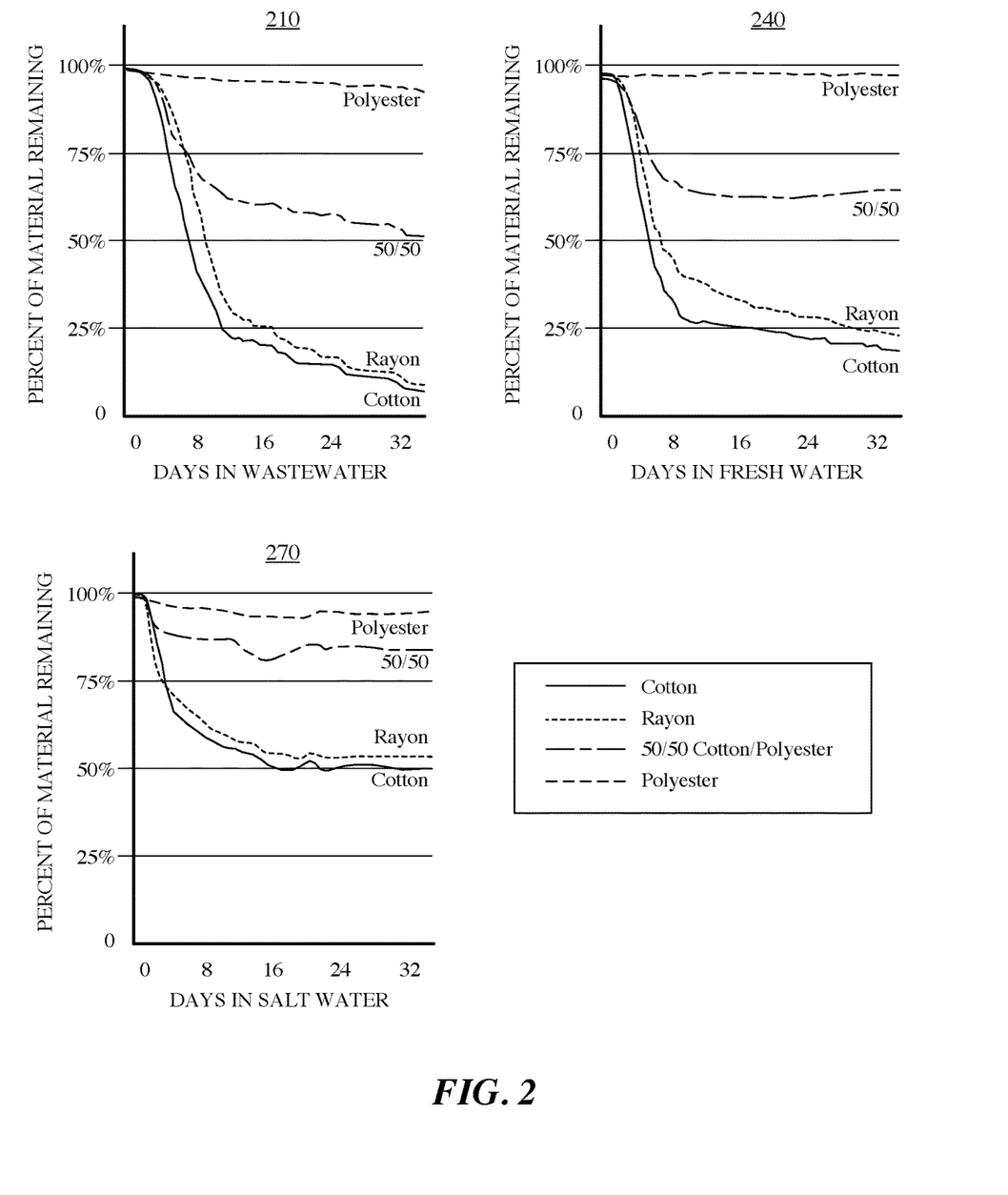
FIG. 2 illustrates exemplary line graphs showing percentages of material remaining as a function of time when yarns made of different materials are placed in different aquatic environments.

As the polyester biodegradation process relies on hydrolysis and oxidation for breaking down long polymer chains, and on microbes for consuming and converting simple monomers or molecules into metabolic by-products, the environment in which biodegradation occurs has significant impacts on the biodegradation rate. FIG. 2 illustrates exemplary line graphs showing percentages of materials remaining as a function of time when yarns made of different materials are placed in different aquatic environments, respectively. Each of graphs 210, 240, and 270 shows the extent of biodegradation of cotton, rayon, a 50%/50% cotton/polyester blend with a ratio of 50% cotton and 50% polyester. These materials are immersed in wastewater, fresh water, or salt water, respectively, for 32 days. At the end of the 32 days, the percentages of materials remaining approximately flatten out for all materials. In wastewater, only 8% of the cotton remains, while 94% of the polyester remains; in fresh water, 21% of the cotton remains, while almost 100% of the polyester remains; in salt water, 52% of the cotton remains, while 96% of the polyester remains. Furthermore, it can be observed from the graphs that rayon biodegrades only slightly less than cotton under the different aquatic conditions, while the 50%/50% cotton/polyester blend biodegrades much more than polyester but much less than cotton or rayon. That is, in these typical aquatic environments, cotton and rayon are the most biodegraded materials, while pure polyester barely biodegrades, and the polyester/cotton blend biodegrades at a percentage of less than 50%, corroborating with the 50% to 50% composition ratio between biodegradable cotton and non-biodegradable polyester.

The higher biodegradation of materials in wastewater shown in subgraph 210 is a result of the abundance of microorganisms or microbes in such an aquatic environment. To increase the biodegradation compacity of polyester, small amounts of catalytic additives may be mixed with source materials before the process steps for making the biodegradable yarns. For example, some biodegradable additives when combined with polyester may attract microbes, and enable the microbes to efficiently hydrolyze polymer chains, by interacting with enzymes produced by the microbes. In embodiments of the present invention, biodegradable additives are introduced into recycled polyester or PET resins in carefully controlled amounts to enable fast and thorough natural biodegradation, but without interfering with or compromising the physical properties or characteristics of the resulting yarns.

Manufacturing Biodegradable Textile Yarns from Recycled Materials

Figure 3:
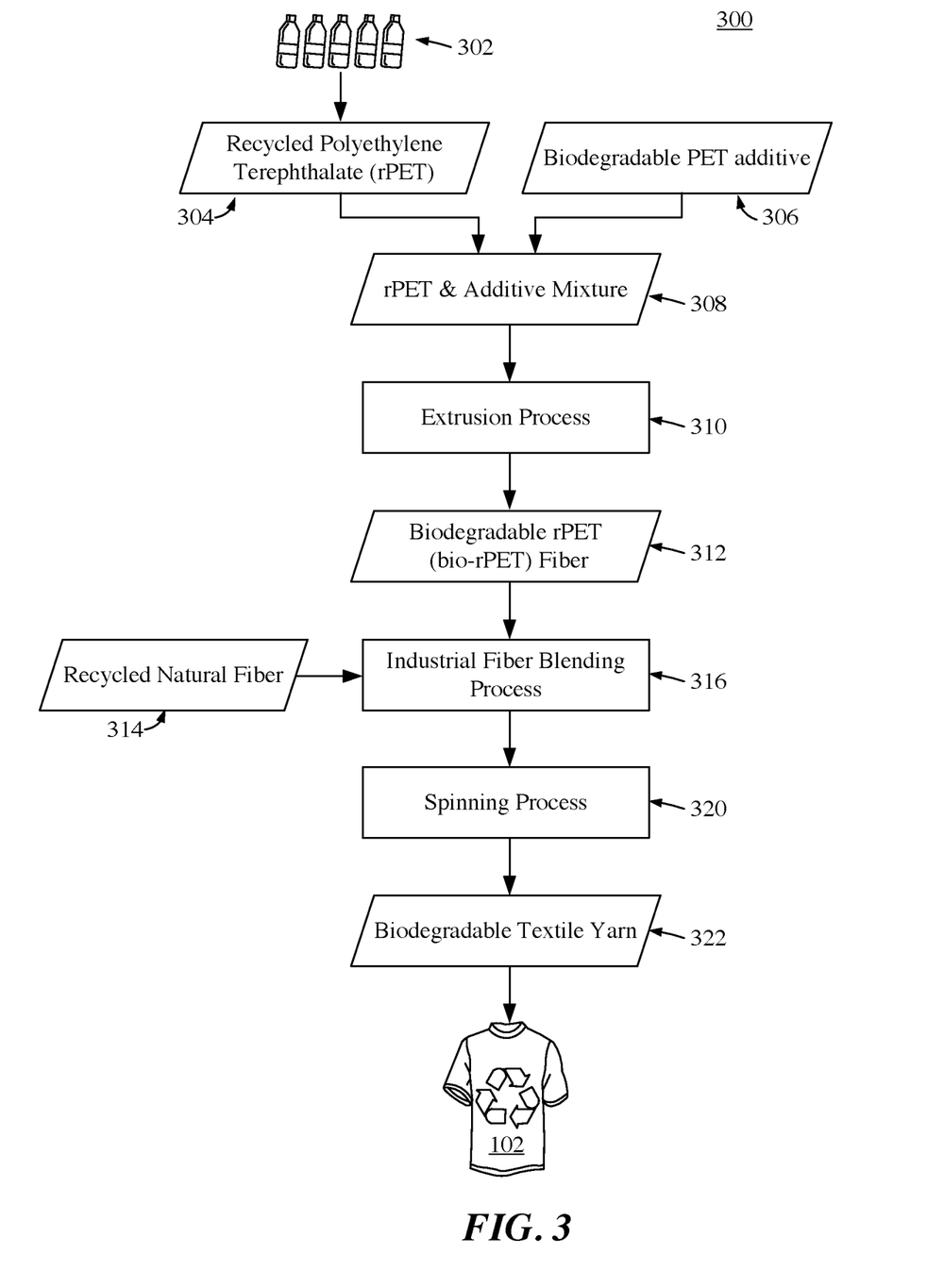
FIG. 3 illustrates an exemplary process for producing a biodegradable, recycled polyethylene terephthalate (bio-rPET) fiber and for producing a biodegradable textile yarn from the bio-rPET fiber and a recycled natural fiber, according to one embodiment of the present invention.

FIG. 3 illustrates an exemplary process 300 for producing a biodegradable textile yarn from a biodegradable, recycled polyethylene terephthalate (bio-rPET) fiber and a recycled natural fiber, according to some embodiments of the present invention. Polyethylene terephthalate (PET) is a thermoplastic polymer resin of the polyester family. A polyester is a synthetic resin containing ester functional group (COO) in its polymer chains. PET is typically used for making synthetic textile fibers, disposable and reusable containers for liquids, and for thermoforming other products for the food, medical, and general retail industries. In the context of textile production, PET is generally referred to as "polyester" directly. In what follows, the term PET and polyester are used interchangeably.

As thermoplastic polymers can be re-melted and remolded, polyester fibers can be recycled and reused. In some embodiments of the present invention, recycled PET (rPET) 304 may be obtained from, for example, recycled PET water bottles 302 through one or more recycling steps including sorting, wash cleaning, shredding and/or grounding, and melt compounding into fiber grade pellets. The physical and chemical characteristics of the rPET pellets may be controlled during the recycling process, to be similar to those of virgin PET. For example, careful monitoring of water content and drying of rPET flakes before melting and polycondensation, plus high reaction speed in the rPET melt, may ensure high intrinsic viscosity (IV), which is an indicator of the average length of the rPET's polymer chains, and the main indicator of quality. The higher the intrinsic viscosity, the longer the polymer chains, and the higher the performance characteristics when made into rPET textile fibers. A higher degree of polymerization provides higher crystalline regions, a more concentrated molecular weight, a higher melting point, thus lower thermal degradation, higher tensile strength and resistance against deterioration, and even high color brightness. In various embodiments, rPET 304 may have an intrinsic viscosity between about 0.25 dL/g and about 0.85 dL/g, about 0.30 dL/g and about 0.80 dL/g, about 0.35 dL/g and about 0.75 dL/g, or about 0.40 dL/g and about 0.70 dL/g.

Generally, virgin PET fiber is more uniform with higher IV than rPET. That is, virgin PET may have longer polymer chains than rPET, which is at minimum a second-generation product that has gone through some degree of oxidative breakdown. Virgin PET also typically has a better thermal stability but a lower crystallization rate than rPET. Thus, rPET has a lower molecular weight and decreased IV in general, and under laboratory testing has shown 10% less elongation before breakage when compared to virgin PET. Furthermore, chemically recycled re-polymerized PET shows properties nearly identical to virgin PET, when compared to the more common rPET mechanically recycled from ground and melted water bottles.

As shown in FIG. 3, small pieces of rPET 304, in the form of flakes, chips, granules, or pellets, may be mixed with a biodegradable PET additive 306 to form a mixture 308. For example, a BIOSPHERE or an ECOPURE G2 biodegradable plastic additive may be mixed in at a ratio between 0.5 weight % (wt %) and 3 wt % of a total weight of mixture 308. Such catalytic additives help attract microbes to rPET fibers, fracture and therefore increase the surface of polymer chains for the microbes to attack, and further assist in enzymic reactions that enable the microbes to digest and convert rPET into elements that can re-enter the ecosystem.

Next, the rPET and additive mixture 308 may undergo an extrusion process 310 using an industrial polyester filament extruder to produce a bio-rPET fiber 312. For example, in an illustrative embodiment, rPET pellets 304 and biodegradable PET additive 306 may first be dried together or separately to reduce their moisture content, for preventing hydrolytic degradation at elevated melt temperatures. Biodegradable PET additive 306 may be a pelletized masterbatch that can be processed in the same way as other masterbatches. In some embodiments, biodegradable PET additive 306 may be slightly hygroscopic, absorbing water vapor from the surrounding air, and requiring to be stored and handled as PET resin which is itself hygroscopic.

Next, the additive pellets may be added into a feed hopper with the rPET pellets, and the pellet mix may be extruded through a feed-screw into a melt pump where the molten polyester and biodegradable masterbatch are combined, then extruded and hydro-set to bio-rPET fibers using standard industrial manufacturing processes. For example, such processes may be the same or similar to those for making polyester staple fiber 1.2 D×38 mm, with standard dimensions of 38 millimeters in length, and 1.2 deniers in fineness. A denier is a direct measure of linear density expressed in grams (0.035 ounces) per 9 kilometers (5.6 miles). For a given material, the smaller the denier, the finer the fiber. A fiber may be considered a microfiber if it is one denier or less.

Next at a process step 316, a recycled natural fiber 314 may be blended with bio-rPET fiber 312 in an industrial fiber blending process. Fiber blending in yarn production is the process of combining fibers of different types, origins, lengths, thickness, or color, to attain characteristics which are unobtainable from a single fiber component. Performed before a spinning process, blending can impart desirable characteristics such as strength, durability, softness, absorbency, ease of washing, resistance to wrinkling and/or tear, shape and/or color retention, and improved aesthetic effects. Fiber blending may also reduce cost by combining expensive fibers with less costly ones, or may achieve special color or texture effects. Fiber mixtures obtained in such a manner are called blends. For example, poly-cotton blends of synthetic polyester and natural cotton achieves high abrasion resistance of the polyester and good moisture absorbency and feel of the cotton. In some embodiments, the recycled natural fiber 314 may itself be a blend of different natural fibers. For example, the recycled natural fiber 314 may be a blend of a recycled cotton (rCotton) fiber and a recycled cellulose fiber such as viscose, rayon, or lyocell, and the biodegradable recycled fiber blend resulting from step 316 may be a tri-blend of bio-rPET fibers, rCotton fibers, and recycled cellulose fibers, with the bio-rPET fiber making up more than 50 wt % of the total weight of the biodegradable textile fiber blend.

In an exemplary embodiment, bio-rPET staple fiber with dimensions of 1.2 D-1.3 D×38 mm may be blended with mechanically recycled cotton (rCotton) fibers in controlled ratios, for example, at 55% bio-rPET fiber and 45% rCotton fiber, where the rCotton may have an average staple fiber length between 10 mm and 15 mm. The short, irregular nature of the rCotton fibers benefit from the longer, regular, higher tenacity of the 38 mm, extruded bio-rPET fibers, for strength and consistency. Biodegradable textile yarn 322 spun from this bio-rPET/rCotton blend through a spinning process step 320 has good performance and less breakage on high-speed circular knitting machines. The spinning may comprise open end spinning technology or air-jet spinning technology. Furthermore, this biodegrade textile yarn 322 may biodegrade at a rate similar to natural cotton fiber, in landfill, marine, and wastewater treatment environments, and may be subjected to both aerobic and anaerobic degradations.

In various embodiments, recycled natural fiber 314 may comprise one or more of recycled cotton fiber, recycled hemp fiber, recycled linen fiber, recycled wool, and recycled cellulose fiber. Such recycled natural fibers may be recycled from pre-consumer or post-consumer textile waste, and the recycling process may use mechanical and/or chemical methods. Pre-consumer textile waste may include excess materials from the production of yarns, fabrics, and textiles, while post-consumer textile waste may come from discarded textile products. In mechanical recycling, textile wastes are recycled without altering their basic structures. For example, cotton textile waste may be sorted, machine stripped or shredded into small pieces, then pulled apart into cotton fiber. Carding may also be necessary to disentangle, clean, and properly mix the recycled cotton fibers. In chemical recycling, textile wastes are recycled through a series of steps into basic building block materials or chemicals. This is especially useful for recycling fabric waste containing more than one type of fiber, as fibers cannot easily be separated mechanically. For example, cellulose waste may be turned into a liquid pulp with chemical solvents, and used for making viscose fibers that imitate natural fibers such as silk, cotton, and linen.

Table 1 shows illustrative weight percentages of bio-rPET fiber 312 blended with recycled natural fiber 314, for making yarns having different weights or linear densities, and used in different textile products. Under the first column, yarn numbers are expressed in units of English Cotton Count (ECC), also referred to as Number English (Ne), the English Yarn Number, or the English cotton yarn number. Yarn numbers are specifically used to describe the size of spun staple fibers and yarns, and is an indirect measure of linear density and yarn weight. In English units, the English yarn number indicates the number of 840 yards lengths per pound of yarn. In metric SI units, the English yarn number indicates the number of one kilometer (km) lengths per kilogram (kg) of yarn. The lower the yarn number, the heavier the yarn, and the larger the yarn. Moreover, yarn numbers are often shown in conjunction with a number of plies. For example, 60/1 represents a yarn size of 60, one ply (also referred to as "60's"), while 60/2 represents two size 60 yarns, plied (also referred to as "60's two").

In Table 1, representative weight percentages (wt %) for bio-rPET fibers in making biodegradable textile yarns are provided for different yarn numbers, respectively. This representative wt % is a typical or practical value that can be used directly in yarn manufacturing to ensure high enough yarn tenacity for high-speed machine knitting. Also shown are preferred bio-rPET wt % ranges and functional bio-rPET wt % ranges. The preferred ranges indicate respective amounts of bio-rPET fibers that can be used to make biodegradable textile yarns with good tenacity and physical properties. The functional ranges indicate respective amounts of bio-rPET fibers that can be used to make biodegradable textile yarns with acceptable tenacity and physical properties.

TABLE 1

Percentage of rPET in biodegradable textile yarns

| Yarn Weight/ Linear Density (English Units) | Yarn Weight/ Linear Density (SI Units) | Representative wt % | Preferred wt % Range | Functional wt % Range |
|---|---|---|---|---|
| 32-60 Ne | 55-102 Ne | About 65% | 55-75% | 40-99% |
| 28-32 Ne | 48-54 Ne | About 55% | 40-60% | 30-99% |
| 24-28 Ne | 41-48 Ne | About 50% | 35-55% | 20-99% |
| 18-24 Ne | 31-41 Ne | About 40% | 30-50% | 1-99% |
| 12-18 Ne | 20-31 Ne | About 30% | 20-40% | 1-99% |
| 6-12 Ne | 10-20 Ne | About 20% | 10-30% | 1-99% |
| 1-6 Ne | 2-10 Ne | About 20% | 10-30% | 1-99% |

In various embodiments, biodegradable textile yarn 322 is used for producing an interlacing or interlocking yarn network to form a textile. This textile could be used, for example, for producing a T-shirt 102, where the yarn count of the constituting textile yarn may be 30 Ne (Engl. units) in a single ply or "30 singles". In another example, about 10% bio-rPET fibers may be blended with a recycled natural fiber to generate a thick 8 singles biodegradable yarn for making upholstery fabric. For bigger yarns having a yarn count of 20 singles and under, the weight percentage of the bio-rPET may be low, yet sufficient to hold the yarn together, based on the short staple length and mechanical properties of the recycled natural fiber that it is being blended with.

In some embodiments, the bio-rPET fiber is between 5 wt % and 95 wt % inclusive of the total weight of the biodegradable textile yarn; in some embodiments, the bio-rPET fiber is between 10 wt % and 75 wt % inclusive of the total weight of the biodegradable textile yarn; in some embodiments, the bio-rPET fiber is between 40 wt % and 60 wt % inclusive of a total weight of the biodegradable textile yarn; in some embodiments, the bio-rPET fiber is between 50 wt % and 60 wt % of a total weight of the biodegradable textile yarn; in yet some embodiments, the bio-rPET fiber is about 55 wt % of a total weight of the biodegradable textile yarn.

Similarly, biodegradable textile yarns of appropriate yarn numbers may be used to make garments or apparels including, but not limited to, outerwear, coats, pants, dresses, skirts, suits, underwear, swimsuits, active-wears, belts, ponchos, trousers, shorts, footwear, fleece, tees, bottoms, socks, bag, hats, handkerchiefs, scarves, and gloves. In some embodiments, the biodegradable textile may be used to produce consumer products, such as tents, carpets, automobile covers, grill covers, tarps, umbrellas, furniture covers, and other upholsteries. The production of the biodegradable textile may be through weaving, knitting, crocheting, knotting, tatting, felting, or braiding the biodegradable textile yarn 322.

Illustrative Process Flows

Figure 4:
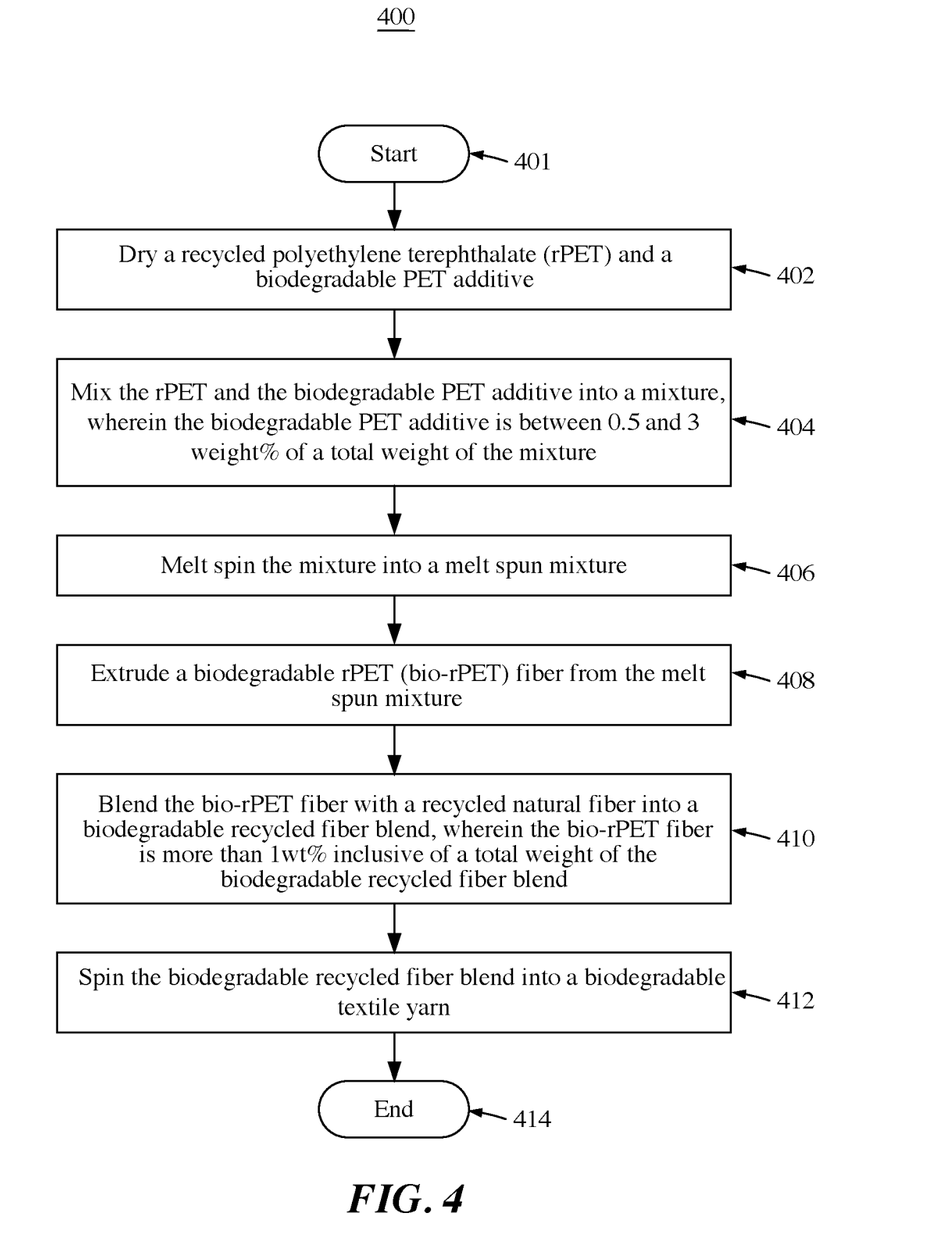
FIG. 4 is an illustrative flow diagram showing an exemplary process for producing a biodegradable textile yarn, according to one embodiment of the present invention.

More specifically, FIG. 4 is an illustrative flow diagram 400 showing an exemplary process for producing a biodegradable textile yarn, according to some embodiments of the present invention.

Upon initialization at a step 401, drying of a recycled polyethylene terephthalate (rPET) and a biodegradable PET additive is performed at a step 402, either together or separately. As discussed previously, PET is hygroscopic, meaning when exposed to the atmosphere, it absorbs water vapor from the surrounding air. The biodegradable PET additive may be slightly or somewhat hygroscopic as well. Water vapor migrates into and distributes throughput PET pieces, with water molecules forming intermolecular bonds to the polymer chains, causing hydrolysis or break down of the polymer chains when heated above the melt temperature.

In different embodiments of the present invention, the drying temperature in step 402 may be between 150° C. and 200° C., between 155° C. and 180° C., or between 160° C. and 170° C. Drying may continue until residual moisture is removed to a value of 0.01% to 0.02% relative humidity. In some embodiments, the rPET and/or the biodegradable PET additive are dried to a moisture level below 1000 parts per million (ppm) water. In some embodiments, dried rPET and biodegradable PET additive may comprise up to about 200 parts per million water, up to about 100 ppm water, up to about 50 ppm water, or no water (0 ppm). In the case where the rPET and the biodegradable PET additive are in pellet forms, the drying temperature may be between 60 and 70° C. (140 and 158° F.) and the drying time may be between 2 and 6 hours.

At a next step 404, the rPET and the biodegradable PET additive are mixed into a mixture, wherein the biodegradable PET additive makes up between 0.5 and 3 weight % of a total weight of the mixture. The lower the weight percentage of the biodegradable PET additive, the cheaper the biodegradable textile yarn; the higher the weight percentage of the biodegradable PET additive, the higher the biodegradability of the resulting biodegradable textile yarn. In some embodiments, the biodegradable PET additive makes up about 1 wt % of the total weight of the mixture. In some embodiments, the biodegradable PET additive is between 1 wt % and 1.5 wt % of the total weight of the mixture.

In some embodiments, steps 402 and 404 may be exchanged in order, or be carried out simultaneously. For example, the biodegradable PET additive may be dosed with the rPET and loaded into a resin dryer. Alternatively, the biodegradable PET additive may be dried separately in a smaller dryer, and fed directly through a feed-throat of a polymer feed hopper on an extruder.

At a next step 406, melt spinning is performed on the rPET and biodegradable PET additive mixture to create a melt-spun mixture, and this melt-spun mixture is extruded into a bio-rPET fiber filament during a step 408. During these melt spinning and extrusion process steps, a viscous melt of polymer is extruded through a spinneret or a die having a number of holes, under forcing through a feed-screw or a piston, into a chamber or region where the extruded filaments can be instantly cooled and solidified, then pulled, drawn, and taken up onto a wheel. A number of factors in the melt spinning and extrusion process influence the quality of the resulting rPET fibers and the yarn that can be spun from them. Such factors include the quality of the WET inputs, melt temperature, acrd take up pressure. In some different embodiments, the melt spinning and extrusion are done at a temperature between about 200° C. and about 350° C., between about 240° C. and about 320° C., between about 265° C. and about 290° C., or between 280° C. and 300° C. In some embodiments, the melt-spun mixture from step 406 is introduced into a hopper of an extruder or extruding machine for step 408.

In some embodiments, the extruded bio-rPET fiber has a length of 38 mm and a linear mass density between 1.2 deniers and 1.4 deniers. In some embodiments, the bio-rPET fiber has a linear mass density between about 0.05 tex and about 0.5 tex, where tex is a direct measure of linear density expressed in grams (0.035 ounces) per kilometer (0.62 miles). In some embodiments, the bio-rPET fiber has a linear mass density between about 0.08 tex and about 0.4 tex, between about 0.10 tex and 0.35 tex, or between about 0.13 tex and 0.33 tex. In different embodiments, the extruded bio-rPET fiber may have an average length between about 20 millimeters (mm) and about 300 mm, between about 20 mm and about 100 mm, between about 30 mm and about 80 mm, or between about 38 mm and about 60 mm.

At a next step 410, fiber blending takes place to combine the bio-rPET fiber with a recycled natural fiber to form a biodegradable recycled fiber blend. Exemplary weight percentages of bio-rPET fibers are given in Table 1, for different target yarn counts, respectively. Exemplary recycled natural fibers include, but are not limited to, a mechanically recycled cotton waste fiber, a mechanically recycled hemp waste fiber, a mechanically recycled linen waste fiber, a recycled wool waste fiber, or a chemically recycled cellulose fiber from textile or agricultural waste. In some embodiments, more than one type of the recycled natural fiber listed above may be blended with the bio-rPET fiber to form the biodegradable recycled fiber blend.

At a last process step 412, the biodegradable recycled fiber blend is spun into a biodegradable textile yarn. For example, open-end spinning or an air-jet spinning may be performed. The overall biodegradable textile yarn production process terminates at step 414.

Figure 5:
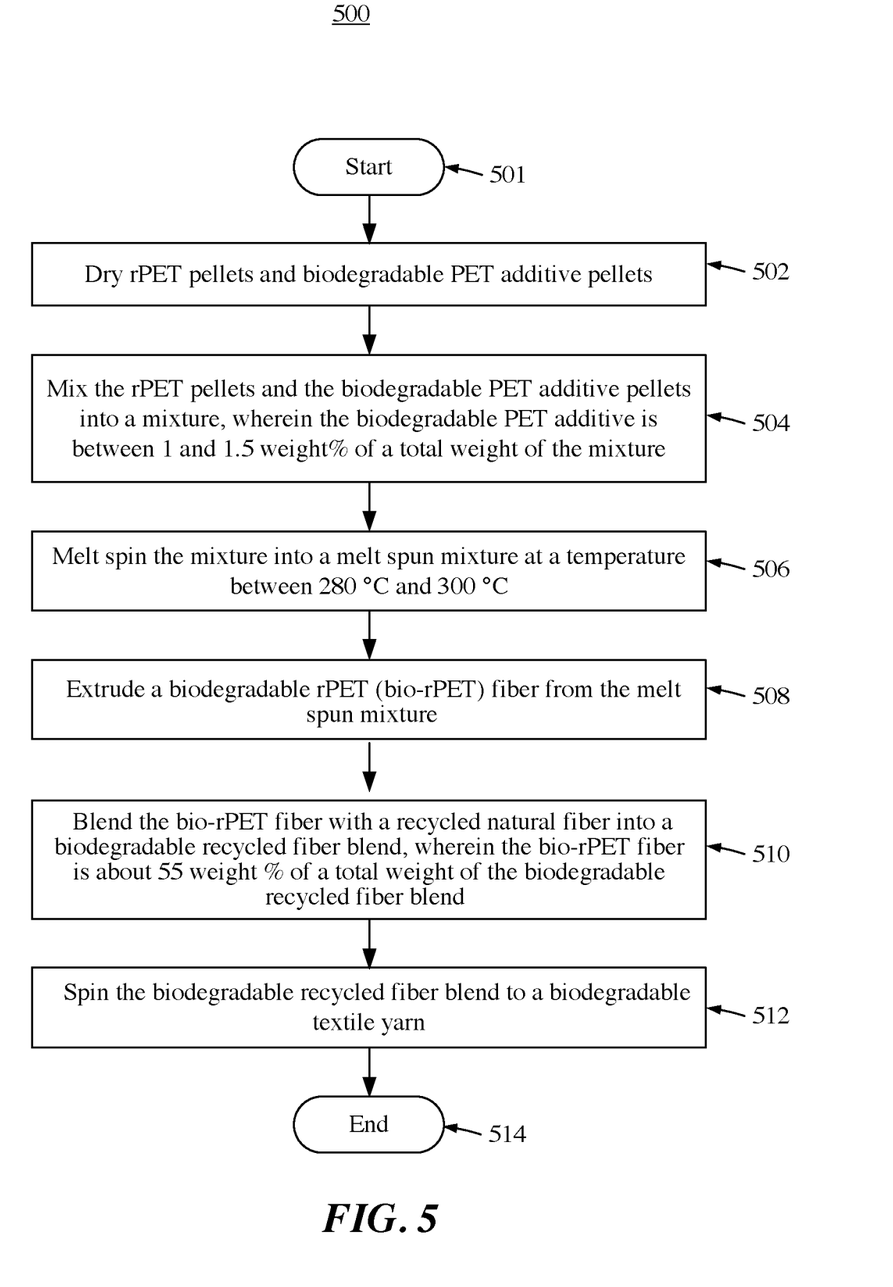
FIG. 5 is an illustrative flow diagram showing another exemplary process for producing a biodegradable textile yarn, according to one embodiment of the present invention.

FIG. 5 is an illustrative flow diagram 500 showing another exemplary process for producing a biodegradable textile yarn, according to some embodiments of the present invention. Upon initialization at a step 501, rPET pellets and biodegradable PET additive pellets are dried at a first step 502. In some embodiments, the rPET has an intrinsic viscosity between 0.40 dL/g and 0.70 dL/g, and the drying is performed at a temperature between 160° C. and 170° C. until the residual moisture is reduced to 0.01% to 0.02% relative humidity or up to 50 ppm water. Next, the rPET pellets and the biodegradable PET additive pellets are mixed at step 504, where a percentage of the biodegradable PET additive is between 1 wt % and 1.5 wt % of a total weight of the resulting mixture. Yet in some embodiments, a pellet count or a number of the biodegradable PET additive pellets is between 1 wt % and 1.5 wt % of a total pellet count of the resulting mixture. At steps 506 and 508, the mixture is melt spun and extruded at a temperature between 280° C. and 300° C. to create bio-rPET fibers. At a next step 510, the bio-rPET fiber is blended with a recycled natural fiber to generate a biodegradable recycled fiber blend, where the bio-rPET fiber is between 50 wt % and 60 wt % of a total weight of the biodegradable recycled fiber blend. Finally, the fiber blend is spun at step 512 into a biodegradable textile yarn, before the overall process terminates at step 514.

CONCLUSIONS

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every use case and application is accommodated to practice the methods of the present invention.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

For simplicity of explanation, the embodiments of the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

In the foregoing description, numerous specific details are set forth, such as specific materials, dimensions, processes parameters, etc., to provide a thorough understanding of the present invention. The particular features, structures, materials, or characteristics may be combined in any suitable manner in one or more embodiments. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. Reference throughout this specification to "an embodiment", "certain embodiments", or "one embodiment" means that a particular feature, structure, or characteristic described in connection with the embodiment is included in at least one embodiment. Thus, the appearances of the phrase "an embodiment", "certain embodiments", or "one embodiment" in various places throughout this specification are not necessarily all referring to the same embodiment.

What is claimed is:

1. A biodegradable textile yarn made from recycled materials, comprising:
   a biodegradable, recycled polyethylene terephthalate (bio-rPET) fiber blended with a recycled natural fiber,
   wherein the bio-rPET fiber is made from a recycled PET (rPET) and a biodegradable PET additive to make the rPET biodegradable,
   wherein the biodegradable PET additive is between 0.5 and 3 weight % (wt %) of a total weight of the biodegradable PET fiber, and
   wherein the bio-rPET fiber is more than 1 wt % inclusive of a total weight of the biodegradable textile yarn.

2. The biodegradable textile yarn of claim 1, wherein the bio-rPET fiber is between 5 wt % and 95 wt % inclusive of the total weight of the biodegradable textile yarn.

3. The biodegradable textile yarn of claim 1, wherein the bio-rPET fiber is between 10 wt % and 75 wt % inclusive of the total weight of the biodegradable textile yarn.

4. The biodegradable textile yarn of claim 1, wherein the bio-rPET fiber is between 40 wt % and 60 wt % inclusive of a total weight of the biodegradable textile yarn.

5. The biodegradable textile yarn of claim 1, wherein the bio-rPET fiber is between 50 wt % and 60 wt % inclusive of a total weight of the biodegradable textile yarn.

6. The biodegradable textile yarn of claim 1, wherein the rPET has an intrinsic viscosity between 0.25 dL/g and 0.85 dL/g.

7. The biodegradable textile yarn of claim 1, wherein the bio-rPET fiber has a linear mass density between 0.05 tex and 0.5 tex.

8. The biodegradable textile yarn of claim 1, wherein the recycled natural fiber comprises at least one selected from the group consisting of a mechanically recycled cotton fiber, a mechanically recycled hemp fiber, a mechanically recycled linen fiber, a chemically recycled cellulose fiber, and a recycled wool.

9. The biodegradable textile yarn of claim 1, further comprising:
   a recycled cellulose fiber blended with the bio-rPET fiber and the recycled natural fiber.

10. A biodegradable textile, comprising:
    a network of biodegradable textile yarns of claim 1,
    wherein each biodegradable textile yarn comprises a biodegradable, recycled polyethylene terephthalate (bio-rPET) fiber blended with a recycled natural fiber,
    wherein the bio-rPET fiber is made from a recycled PET (rPET) and a biodegradable PET additive to make the rPET biodegradable,
    wherein the biodegradable PET additive is between 0.5 and 3 weight % (wt %) of a total weight of the biodegradable PET fiber, and
    wherein the bio-rPET fiber is more than 1 wt % inclusive of a total weight of the biodegradable textile yarn.

* * * * *